(12) United States Patent
Berger et al.

(10) Patent No.: US 6,239,696 B1
(45) Date of Patent: May 29, 2001

(54) SIGNAL LIGHT SYSTEM FOR AGRICULTURAL EQUIPMENT

(75) Inventors: John G. Berger, Landisville; Philip J. Ehrhart, Narvon, both of PA (US)

(73) Assignee: New Holland North America, Inc., New Holland, PA (US)

( * ) Notice: Subject to any disclaimer, the term of this patent is extended or adjusted under 35 U.S.C. 154(b) by 0 days.

(21) Appl. No.: 09/281,280

(22) Filed: Mar. 30, 1999

(51) Int. Cl.⁷ .................................................. B60Q 1/26
(52) U.S. Cl. ..................... 340/463; 340/467; 340/465; 340/475
(58) Field of Search .................................. 340/463, 467, 340/465, 475; 307/10.8

(56) References Cited

U.S. PATENT DOCUMENTS

| | | | |
|---|---|---|---|
| 3,849,664 | 11/1974 | Bryant | 307/10 LS |
| 3,970,860 | 7/1976 | Purdy | 307/10 LS |
| 4,006,453 | 2/1977 | Bryant | 340/67 |
| 4,270,115 | 5/1981 | Bonnett | 340/67 |
| 4,357,594 | 11/1982 | Ehrlich et al. | 340/72 |
| 4,751,431 | 6/1988 | Ducote | 315/77 |
| 4,916,431 * | 4/1990 | Gearey | 340/463 |
| 4,939,503 | 7/1990 | Swanson | 340/468 |
| 5,027,031 | 6/1991 | Wheelock | 315/77 |
| 5,030,938 | 7/1991 | Bondzeit | 340/431 |
| 5,043,698 * | 8/1991 | Tabacchi | 340/463 |
| 5,198,798 * | 3/1993 | Lietzow et al. | 340/465 |
| 5,381,135 * | 1/1995 | Blount | 340/463 |
| 5,442,332 * | 8/1995 | Hughes | 340/463 |
| 5,498,910 | 3/1996 | Hopkins et al. | 307/10.1 |
| 5,498,929 | 3/1996 | Formwalt, Jr. | 315/77 |
| 5,521,466 | 5/1996 | Vincent | 315/77 LS |
| 5,739,751 * | 4/1998 | Ishihara et al. | 340/475 |
| 5,786,752 * | 7/1998 | Bucalo et al. | 340/463 |
| 5,786,753 * | 7/1998 | Craig et al. | 340/467 |
| 5,955,943 * | 9/1999 | Trbovich | 340/475 |
| 6,002,330 * | 12/1999 | Brandt | 340/475 |

\* cited by examiner

Primary Examiner—Jeffery Hofsass
Assistant Examiner—John Tweel, Jr.
(74) Attorney, Agent, or Firm—Griffin & Szipl, P.C.

(57) ABSTRACT

A self propelled windrower having no brake pedal is provided with a signal light system conforming to standards for agricultural equipment traveling on public roads. The ground speed of the equipment is sensed and, after it exceeds a threshold speed, computation of equipment acceleration/deceleration begins. When the deceleration exceeds a deceleration threshold, the brake lamps are enabled according to the settings of left turn and right turn signal switches. The brake lamps are enabled as long as the deceleration exceeds the threshold and for a short interval (2 sec) thereafter. If the speed drops below the speed threshold during the short interval, the brake lamps are enabled for an extended period (2 min).

13 Claims, 5 Drawing Sheets

SIGNAL LIGHT SYSTEM FOR AGRICULTURAL EQUIPMENT

FIELD OF THE INVENTION

The present invention relates to a signal light system for self-propelled agricultural equipment, the system conforming to the enhanced lighting standards required for on-road use. The invention provides warning, turn and braking signals for equipment of a type having no brake pedal.

BACKGROUND OF THE INVENTION

The 1996 revisions (ASAE 279.10) to ASAE standard 279.9 for the lighting and marking of agricultural equipment when traveling on a highway require that tractors and self-propelled farm equipment must have two amber warning lights, visible from the front and rear, and flashing in unison at a rate of 60 to 85 flashes per minute. Turn signals are required and the amber warning lights must also serve as the turn indicators. When a turn is signaled, the amber light in the direction of the turn must flash and the amber light in the direction opposite the turn must become steady burning. The amber flashing warning lamp in the direction of turn must increase in flashing rate a minimum of 20 flashes per minute, so as to flash at a rate of at least 80 but no greater than 110 flashes per minute. In addition, a red tail lamp or an additional amber lamp must flash in the direction of turn and in unison with the amber flashing warning lamp.

Typically, the signal for energizing the brake lamps on a vehicle is derived from a switch operated either by a brake pedal which is depressed to cause deceleration, or by the increase in pressure in the hydraulic braking system when the brake pedal is depressed. However, some agricultural equipment, such as the model HW340 windrower currently marketed by New Holland North America, Inc., New Holland Pa., is propelled by hydraulic motors which drive the wheels. The equipment has no hydraulic brake system and does not have a brake pedal.

PRIOR ART

U.S. Pat. No. 4,070,562 discloses a system for warning an operator when there is a sudden acceleration/deceleration in wheel speed such as might occur when the brakes are applied or the wheel speed accelerates too rapidly on an icy road. A sensor senses the speed or rate of wheel rotation over first and second intervals of time and computes the acceleration/deceleration from the sensed speed. When the wheel acceleration/deceleration exceeds a threshold, an audible or visible warning is generated to warn the operator of the vehicle that an abnormal running condition exists.

U.S. Pat. No. 4,357,594 discloses a warning system for a vehicle having a brake pedal. The deceleration is determined from an accelerometer, brake pressure, or the sensing of wheel speed and one or more brake lamps are turned on depending on the vehicle deceleration.

U.S. Pat. No. 5,498,929 teaches that an adapter may be provided to connect the lamp circuits on a towed agricultural implement to the lamp circuits of a towing vehicle so that operation of the lamps on the implement conforms to ASAE standard 279.10.

SUMMARY OF THE INVENTION

An object of the present invention is to provide a warning, turn and signal light system for a vehicle having no brake pedal.

Another object of the invention is to provide a warning, turn and braking signal light system for agricultural equipment having no brake pedal, the system producing visible warning, turning and braking indications according to ASAE standards for on-road use of agricultural equipment.

A further object of the invention is to provide a signal light system for self-propelled agricultural equipment having no brake pedal, the system comprising a left brake lamp and a right brake lamp visible from the rear of the equipment; left and right turn signal switches, each switch having an active state and an inactive state; a ground speed sensor; and a controller for sensing the states of the switches, the controller being responsive to the ground speed sensor for computing the acceleration/deceleration of the equipment; the controller including means for comparing the computed acceleration/deceleration with a deceleration threshold and enabling the left brake lamp and the right brake lamp according to the states of the turn signal switches only if the equipment deceleration exceeds the deceleration threshold.

The controller includes means for enabling the right and left brake lamps as long as the equipment deceleration exceeds the deceleration threshold, and for a short interval of time after the equipment deceleration no longer exceeds the threshold. The controller also includes means for comparing the ground speed of the equipment with a speed threshold and enabling the deceleration comparing means only after the ground speed exceeds the speed threshold. The controller enables the left brake lamp and right brake lamp for an extended interval of time if, during said short interval, the ground speed drops below the speed threshold.

Yet another object of the invention is to provide, in self-propelled agricultural equipment having left and right turn signal switches each having an active and an inactive state and left and right brake lamps but no brake pedal, a method of controlling the brake lamps, the method comprising sensing the ground speed of the equipment; when the ground speed exceeds a threshold speed, initiating computation of the acceleration/deceleration of the equipment from the sensed ground speed; when the deceleration exceeds a deceleration threshold, enabling the left and right brake lamps according to the states of the turn signal switches for as long as the deceleration exceeds the deceleration threshold and for a short interval of time thereafter; and, if the ground speed falls below the threshold speed during the short interval of time, enabling the left and right brake lamps according to the states of the turn signal switches for an extended interval of time.

Other objects and advantages of the invention will become obvious from consideration of the following description and the accompanying drawings.

DESCRIPTION OF A PREFERRED EMBODIMENT

Figure 1:
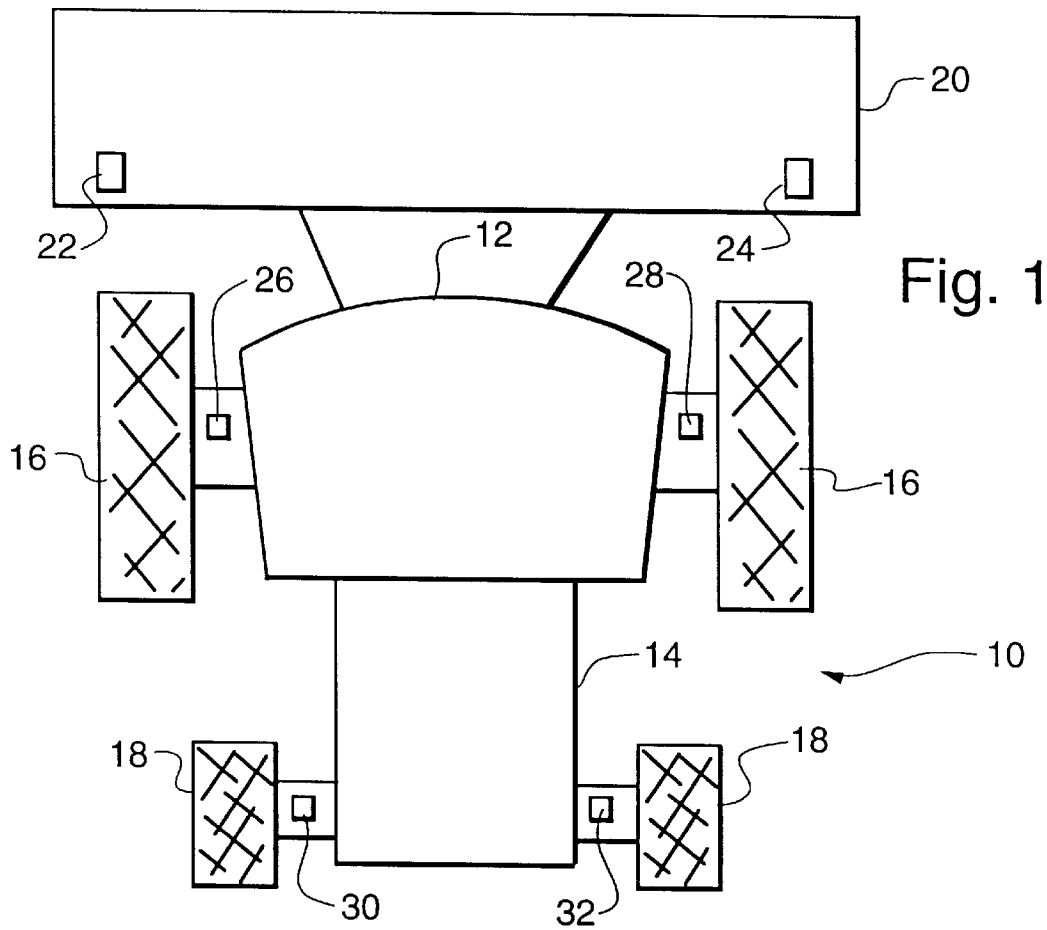
FIG. 1 is a schematic top view of a windrower illustrating the placement of the warning/turning and braking signal lamps.
Figure 6:
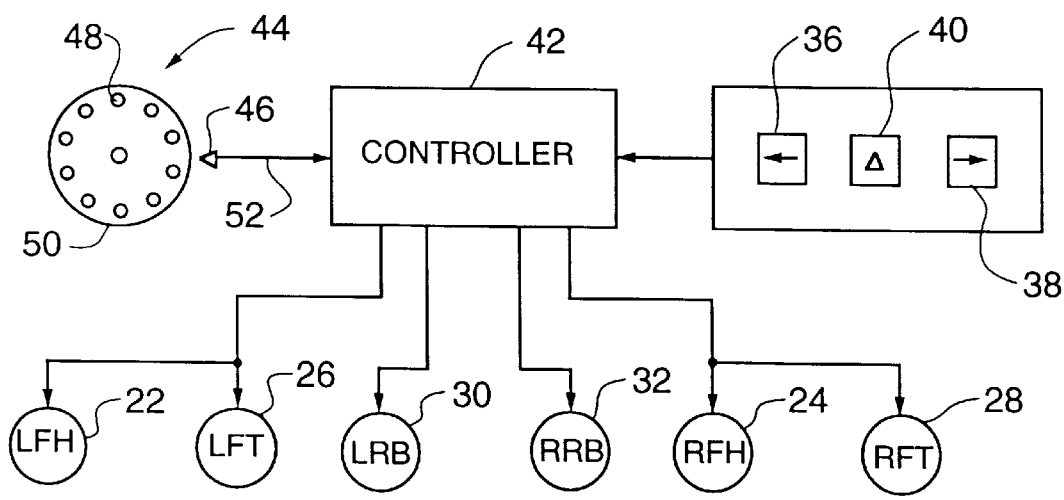
FIG. 6 is a circuit diagram illustrating the signal lamp system.

The invention will be described as embodied in the New Holland HW340 windrower referenced above but it will be understood that the invention may be employed on other windrowers and other types of farm equipment. Referring to FIGS. 1 and 6, a tractor 10 comprises an operator's cab 12 and an engine compartment 14 propelled on two front wheels 16 and two rear wheels 18. A removable header 20 is carried in front of the operator's cab for cutting a crop such as hay, conditioning the crop, and depositing the conditioned crop on a field in a windrow that is straddled by the wheels 16, 18, as the windrower moves over a field.

To conform to the ASAE standard for farm implements traveling on public roads, the header 20 is provided with left and right amber hazard or warning/turn lamps 22 and 24 mounted on top of the header 20 so as to be visible to persons approaching the windrower from the front and rear. In addition, amber warning/turn signal lamps 26 and 28 are mounted on the tractor so as to be visible from the front and rear. The warning/turn lamps 26,28 are provided so that proper signaling will be available in the event the tractor portion of the windrower travels on a public road with the header 20 removed.

The tractor 10 is provided with left and right red brake lamps 30 and 32 mounted so as to be visible from the rear. The brake lamps may be implemented as second filaments within casings which also contain the tail light filaments (not shown). Within cab 12, at a location convenient to the operator, a plurality of switches are provided, including left and right turn switches 36 and 38 for controlling the signaling of left and right turns, respectively, and a hazard or warning switch 40.

A controller or programmable microprocessor 42 samples the switches 36, 38 and 40 every 32.77 ms and sets or resets a flag for each switch to indicate the active or inactive state, respectively, of the switch. If a switch is in an inactive state (flag reset) and is pushed, the controller sets the flag. If a switch is in the active state (flag set) and is pushed, the controller resets the flag. The left and right turn switches are "interlocked" in that if the contoller sets the flag for one of these switches it resets the other. The controller utilizes the flags and the output of a speed sensor 44 to control the signal lamps 22, 24, 26, 28, 30 and 32.

Speed sensor 44 may comprise a magnetic or optical sensor 46 for sensing the leading (or trailing) edges of holes 48 in a gear or wheel 50. Wheel 50 is mounted on a drive shaft for one of the wheels 16 or 18 so as to rotate therewith. Each time sensor 46 senses the edge of a hole in wheel 50, it generates an interrupt signal on a lead 52 to interrupt controller 42. The controller includes a continuously running time stamp counter (not shown) and each time an interrupt signal is received an interrupt routine saves the value in the counter as a time stamp.

Figure 2:
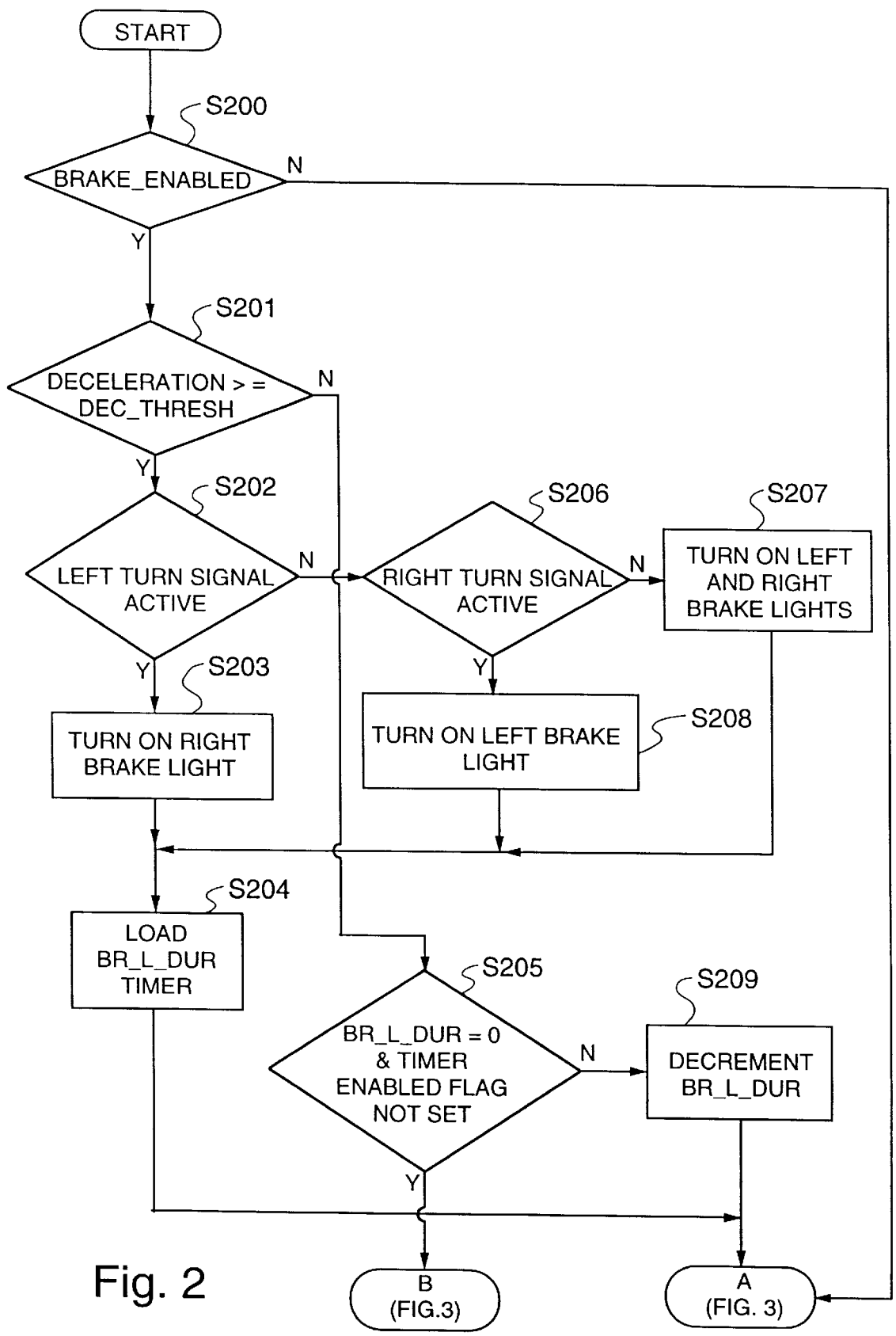
FIGS. 2–4 comprise a flow diagram illustrating that portion of a program executed by a controller that determines which, if any, braking signal lamps are to be energized.
Figure 3:
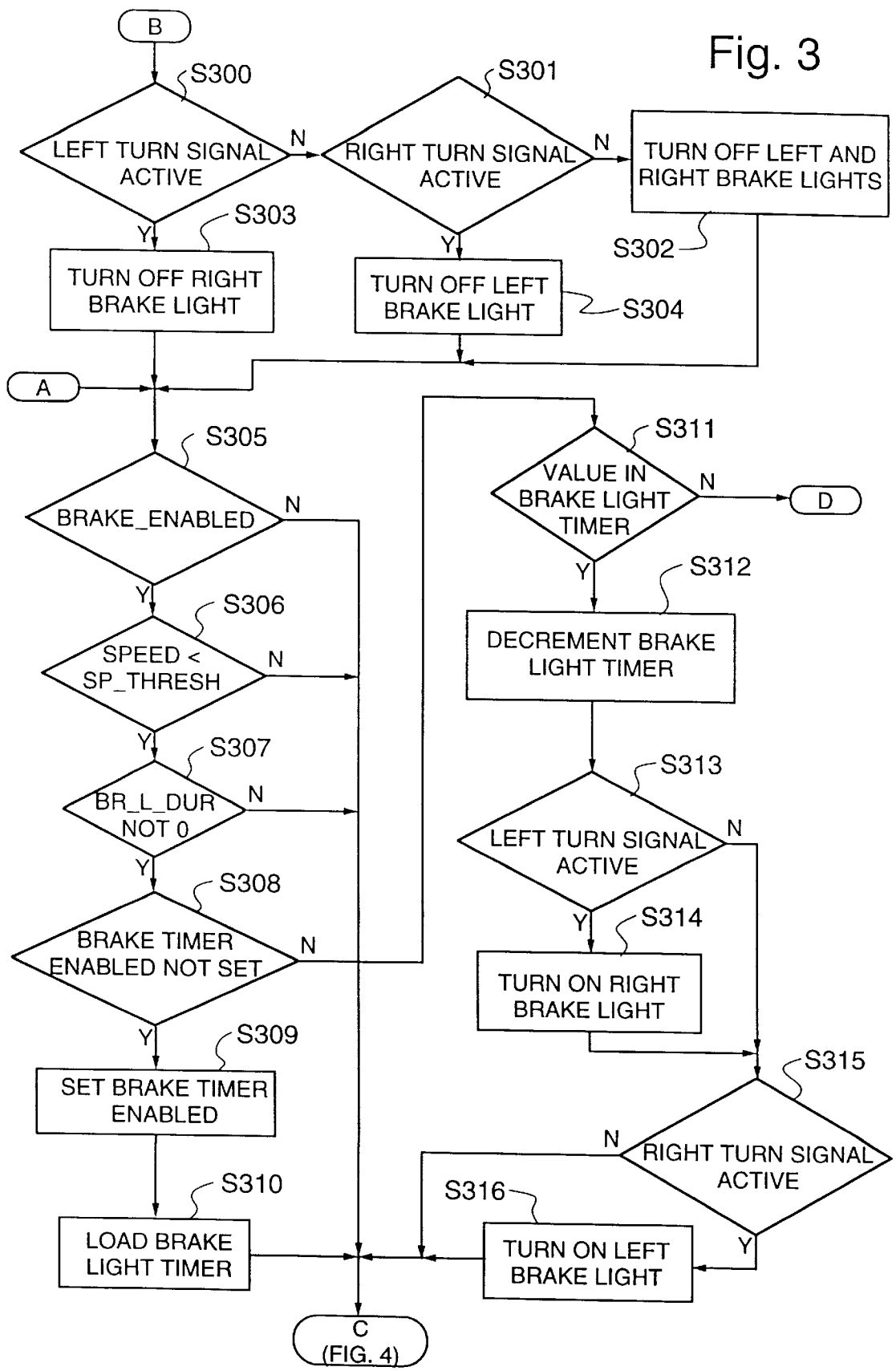
Figure 4:
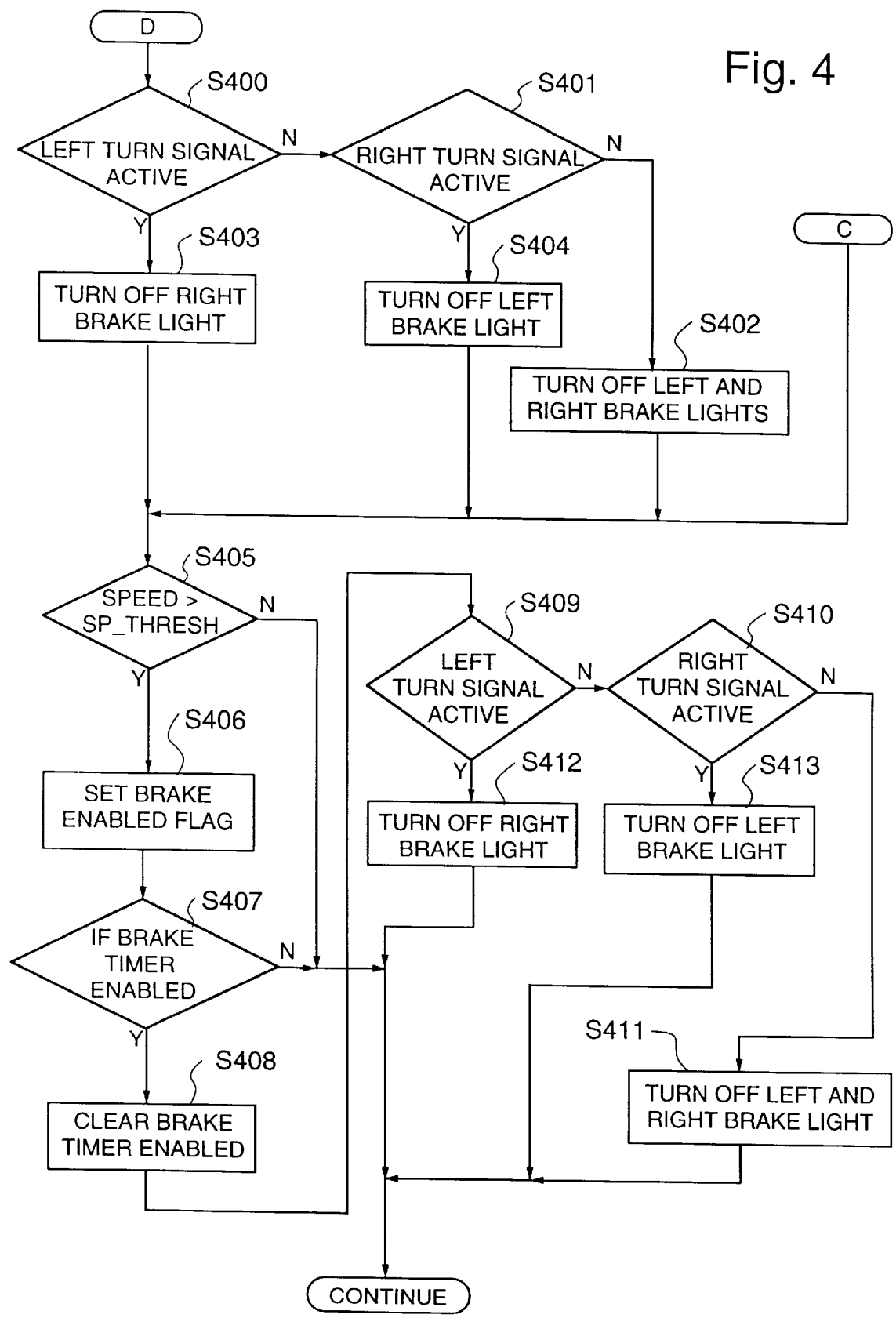

When the ignition is turned on to supply power to the controller, it begins executing a main program once each 32.77 ms. During each execution, the main program first determines the states of switches 36, 38 and 40 and sets a left turn flag (L_TURN) if left turn switch 36 is active, a right turn flag (R_TURN) if right turn switch 38 is active and/or a warning flag (WARN) if switch 40 is active. The portion of the program shown in FIGS. 2–4 is then executed to determine if a left brake flag L_BR, a right brake flag R_BR, or no brake flag should be set. Finally, an output portion of the program, illustrated in FIG. 5, utilizes the flag settings to set appropriate output signals to the turn/warning and brake lamps.

Referring now to FIG. 2, at step 200 (S200) the program tests a Brake_Enabled flag to determine if it is set. This flag is set only after the ground speed of the windrower exceeds a threshold of about 1 mph so at start-up it will not be set. The program advances to S305 (FIG. 3) where the Brake_Enabled flag is again tested before the program advances to S405 in FIG. 4. At S405 the program calculates the ground speed of the windrower and compares it with a threshold speed (Sp_Thresh) chosen to be on the order of 1 mph. The ground speed is calculated from the time stamp values saved during the interrupt service routine executed each time sensor 46 senses the leading edge of a hole in wheel 50. Although the speed may be determined by taking the difference between the time stamp value for the last hole leading edge and the time stamp value for the immediately preceding hole leading edge, S405 preferably averages several (on the order of 10) such determinations to provide a more stable average speed.

At start-up, the ground speed will not exceed Sp_Thresh so from S405 the program continues, eventually reaching and executing the output portion of the program illustrated in FIG. 5 and described later.

After 32.77 ms, S200, S305 and S405 are again executed. This continues until the operator manipulates a control to drive the wheels 16,18 so that the windrower begins to move and reaches a speed exceeding Sp_Thresh. When S405 detects that Sp_Thresh has been exceeded, the program advances to S406 where the Brake_Enabled flag is set. A Brake_Timer_Enabled flag is then tested at S407 and since this flag has not been set the program continues.

The next time S200 is reached, the test finds that the Brake_Enabled flag is set. The acceleration/deceleration in ground speed is computed at S201 and compared with a ground speed deceleration threshold (Dec_Thresh). S201 determines the acceleration/deceleration by first calculating the average speed from the time stamp values as described with reference to S405, and then comparing the average speed just calculated with the average speed calculated and saved during the last execution of S201. The acceleration/ deceleration is the difference in the average speed values divided by the time (32.77 ms) between executions of S201. S201 saves the average speed value just calculated for use in determining the acceleration/deceleration the next time S201 is executed.

Dec_Thresh defines the level of deceleration at which the brake lights are turned on. Thus, it should be made as low as possible in order to provide the earliest warning to a motorist following the windrower that the windrower is slowing down. In a working embodiment the deceleration threshold was chosen to be 1 mph/sec but obviously other threshold values may be used. Assuming the windrower is not decelerating at a rate greater than Dec Thresh the program moves from S201 to S205 where it tests a brake light duration timer (BR_L_DUR). As subsequently explained, BR_L_DUR is set at S204 to time a short interval of about 2 seconds. This defines the minimum interval of time for energizing the brake lights when the deceleration exceeds Dec_Thresh. BR_L_DUR is reset to zero during initialization and contains a zero value the first time S205 is executed.

S205 also tests the Brake_Timer_Enabled flag for a not set condition. This flag is set only if, after reaching Sp_Thresh, the windrower speed drops below Sp_Thresh at a time when BR_L_DUR is still timing a 2-sec interval. Since BR_L_DUR contains a zero value and the Brake_Timer_Enabled flag is not set, the program advances to S300 (FIG. 3).

S300 tests for the active state of the left turn switch 36 by testing the flag L_TURN for a set state. If S300 finds that L_TURN is reset, S301 tests R_TURN. If R_TURN is reset two flags L_BR and R_BR are reset at S302. When the flags L_BR and R_BR are both set they permit the left and right brake lamps 30 and 32 to be energized for steady burn when the output portion of the program (FIG. 5) is executed. If S300 should find that the L_TURN flag is set, the right brake lamp 32 is reset at S303. If S301 determines that R_TURN is set then the left brake flag L_BR is reset at S304.

From S302, S303 or S304 the program moves to S305 which finds that the Brake_Enabled flag is still set. S306 and S405–S407 are then executed as previously described.

At this point the windrower is traveling at a speed greater than Sp_Thresh and is not decelerating at a rate greater than Dec_Thresh. As long as these conditions (collectively the running conditions) remain unchanged, the program repeats S200, S201, S205, S300 and selected steps of S301–S304 (depending on the state of turn switches 36 and 38) S305, S306, and S405–S407. Changes in the running conditions, and the sequence in which the changes occur determine subsequent actions taken by the program.

Assume that no turn is being signaled, the windrower speed is above Sp-Thresh, and the operator reduces the wheel drive speed so that the deceleration exceeds Dec_Thresh. The deceleration is detected at S201 and the program advances to S202 where the L_TURN flag is tested for a set condition. This flag will be in the set condition only if left turn switch 36 was active when the input portion of the program sampled the switch. Under the assumed conditions, S202 finds that the L_TURN flag is reset. The R_TURN flag is then tested at S206 and since it is also reset the microprocessor, at S207, sets both the L_BR and R_BR flags so that when the output portion of the program illustrated in FIG. 5 is executed, both brake lights 30 and 32 will be turned on.

When the brake lights are turned on, they remain on for an interval of at least 2 seconds unless the assumed conditions change. A value representing the 2-second interval is loaded into BR_L_DUR at S204. The program then advances through S305, S306 and S405–S407, and continues.

As long as conditions do not change, the program repeats S200–S202, S206, S207, S204, S305, S306 and S405–S407. When the operator adjusts the ground speed control so that the deceleration no longer exceeds Dec_Thresh, S201 detects the change and the program advances from S201 to S205 thus bypassing S202, S206, S207 and the reloading of BR_L_DUR at S204. S205 detects a non-zero value in BR_L_DUR so BR_L_DUR is decremented at S209 before the program moves onto S305. The program repeats S200, S201, S205, S209, S305, S306 and S405–S407 with the count in BR_L_DUR being decremented each time S209 is reached. On the first execution of the program after BR_L_DUR has been decremented to zero, at S205 the program detects that BR_L_DUR is zero. Since the Brake_Timer_Enabled flag is not set, the program advances to S300 and S301 to test the left and right turn signal flags L_TURN and R_TURN. Since neither flag is set, S302 resets the L_BR and R_BR flags so that both brake lights may be turned off when the output portion of the program is executed. The program then resumes execution of the loop comprising S305, S306, S405–407, S200, S201, and S205.

If, prior to or during the time the windrower is decelerating at greater than Dec_Thresh the operator activates turn signal switch 36 or 38 to signal a left or right turn, the L_TURN or R_TURN flag will be set when the flags are tested at S202 and S206. If the L_TURN flag is set then S203 sets the right brake lamp flag R_BR. If the L_TURN flag is not set, then the R_TURN flag is tested at S206 and if it is set then S208 sets the left brake lamp flag L_BR. The program then proceeds to load BR_L_DUR and decrement it as previously described. When S205 detects that BR_L_DUR has been decremented to zero, S300 tests the L TURN flag and if it is set S303 resets the R_BR flag. If S300 determines that the L_TURN flag is not set then the R_TURN flag is tested at S301. If the R_TURN flag is set, then the L_BR flag is turned off at S304.

Summarizing the operation of the system as explained thus far, the brake light control is not enabled until S405 detects that the ground speed exceeds a threshold level. Once enabled, no flags are set to turn on the brake lamps until after S201 detects that the deceleration rate is greater than a threshold level. When the deceleration rate exceeds the threshold, both L_BR and R_BR are set at S207 to turn on both brake lamps if no turn is being signaled. The R_BR flag is set at S203 to turn on the right brake lamp if a left turn is being signaled, or the L_BR flag is set at S208 to turn on the left brake lamp if a right turn is being signaled. When the deceleration no longer exceeds the threshold, the timer BR_L_DUR begins timing a 2-second interval. At the end of the timed interval, either L_BR or R_BR or both L_BR and R_BR are reset at S302, S303 or S304 to turn off the brake lamp(s) that was/were turned on.

There are instances where it is desirable to keep a brake lamp on for longer than the 2-second interval timed by BR_L_DUR. For example, when preparing for a turn the operator may activate switch 36 or 38 to indicate the direction of turn and decelerate to a stop while waiting for the right of way to make the turn. This wait may exceed two seconds so that all L_BR and R_BR would be reset even though a turn is being signaled. To solve this problem, a timer is enabled to time an extended interval of about 2-minutes if the ground speed drops below a threshold level while the timer BR_L_DUR is still timing a 2-second interval.

S306 compares the ground speed with the speed threshold and if the ground speed drops below the threshold of 1 mph, BR_L_DUR is tested at S307 for a no-zero value. Assuming BR_L_DUR is still timing a 2-second interval, it will be holding a non-zero value so the BR_TIMER_EN flag is tested at S308. This flag has not set so it is set at S309 and a brake lamp timer (BR_L_TIMER) is loaded at S310 to begin timing the extended interval of two minutes. The speed is then compared with Sp_Thresh at S405 and since the speed is less than the threshold the program continues.

On the next execution of the program, it proceeds from S200 through S201 to S205. The BR_L_DUR contains an non-zero value when tested at S205 so it is decremented at S209 and the program follows the path through S305–S308 to S311 where BR_L_TIMER is tested for a non-zero value. If BR_L_TIMER does not contain a zero value, it is decremented at S312. The L_TURN flag is tested at S313 and if it is set the R_BR flag is set at S314 before proceeding to S315. If the L_TURN flag is not set the program moves from S313 to S315 where the R_TURN flag is tested. If R_TURN is set the L_BR flag is set at S316. From S315 or S316 the program advances to S405 and assuming the speed has not been increased above Sp_Thresh, the program continues.

For the next two minutes, and with one exception, the program repeats the steps enumerated in the preceding paragraph provided the ground speed is not increased above Sp_Thresh. BR_L_TIMER is tested for a non-zero value at S311 and decremented at S312 until it has been decremented to zero.

The exception noted above relates to the timer BR_L_DUR which is decremented at S209 and tested for a non-zero value at S307. BR_L_DUR, which times a 2-second interval, will be decremented to zero before the 2-minute timer BR_L_TIMER has been decremented to zero. Immediately after BR_L_DUR reaches zero, the test at S307 diverts the program to S405 thus bypassing S311–S316 and preventing the decrementing of BR_L_TIMER. BR_L_DUR is programmed to "roll over" from zero to its maximum count so that on the next execution of the program S307 will again find a non-zero value in BR_L_DUR and S311–S316 will be executed.

On the next execution of the program after BR_L_TIMER has been decremented to zero, S311 detects the zero condition and the program moves to S400. S400–S404 control the resetting of the brake lamp flags L_BR and R_BR. The left turn flag L_TURN is tested at S400 and if it is set R_BR is reset at S403 so that the right brake lamp will be turned off when the output portion of the program is executed. If L_TURN is not set then S401 tests R_TURN. If R_TURN is set then L_BR is reset at S404 but if R_TURN is not set then both L_BR and R_BR are reset at S404 so that both brake lamps will be turned off.

If the speed is increased above Sp_Thresh before the two minutes has expired, the brake lamps are turned off. S405 detects that the speed is above the threshold so the Brake_Timer_Enabled flag is set at S406 (it is already set) and the Brake_Timer_Enabled flag is tested at S407. The flag is set so at S408 the flag is reset. S409–S413 then control the resetting of the brake lamp flags L_BR and R_BR in exactly the same way as S400–S404 previously described.

Figure 5:
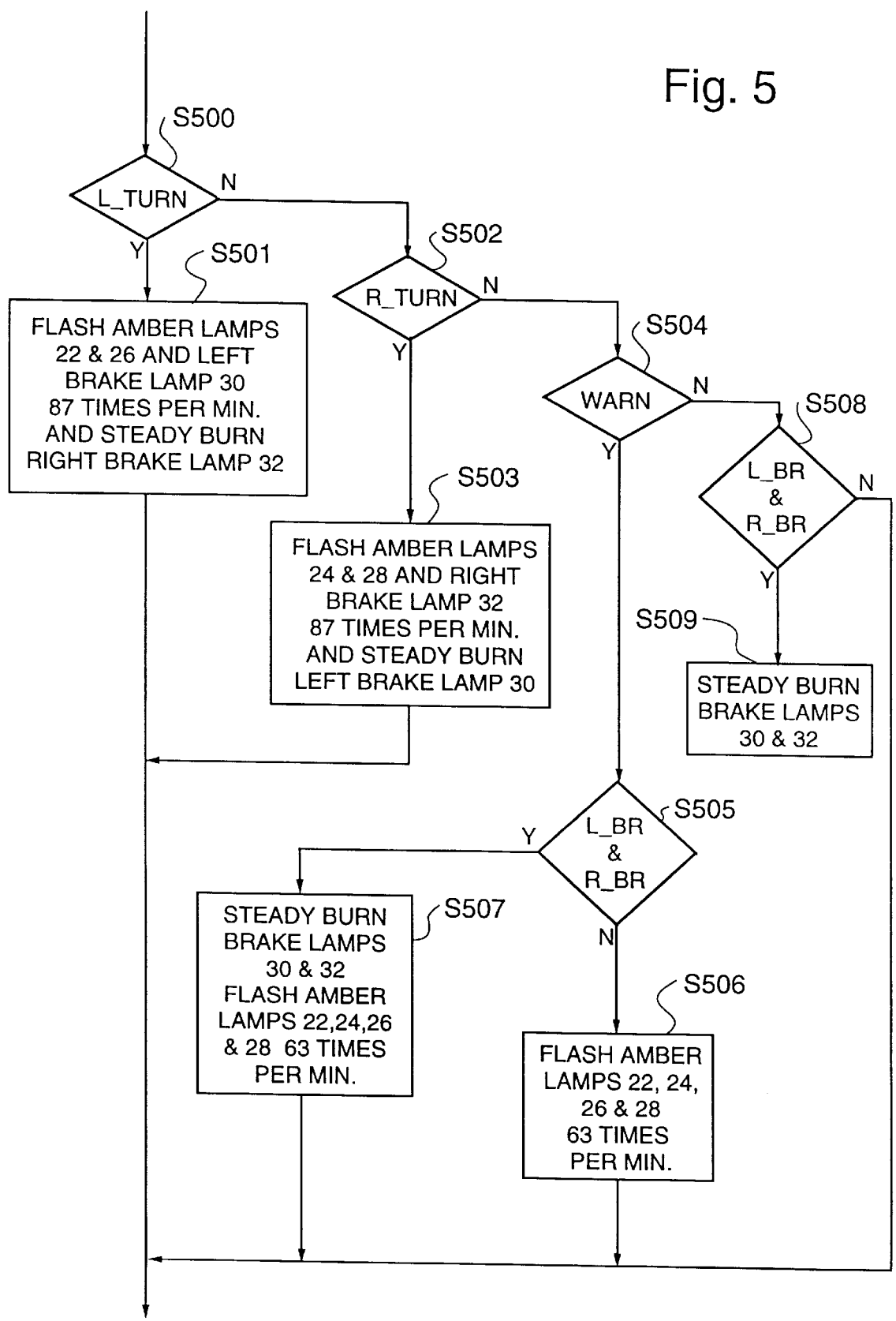
FIG. 5 is a flow diagram illustrating a further portion of the program for energizing the warning/turning and brake lamps.

The output portion of the program illustrated in FIG. 5 utilizes the turn signal switch flags L_TURN and R_TURN, the warning switch flag WARN, and the brake light flags L_BR and R_BR to determine which of the lamps 22, 24, 26, 28, 30 and 32 is be energized and how each lamp is to be energized, that is, whether a lamp is to be steady burning or flash, and if flashing whether it is to flash at a first or a second frequency. L_TURN is tested at S500 and if it is set S501 sets outputs to flash the left amber warn/turn lamps 22 and 26 and the left brake lamp 30, and steady burn the right brake lamp 32. The flashing frequency in a commercial embodiment was chosen to be 87 times per minute but may be within the range of 80 to 110 to conform to the standards.

If S500 determines that L_TURN is not set then S502 tests R_TURN. If R_TURN is set then S503 sets outputs to flash the right amber warn/turn lamps 24 and 28 and the right brake lamp 32, and steady burn the left brake lamp 30. Again, the flashing frequency was chosen to be 87 times per minute.

If S502 determines that R_TURN is not set, the WARN flag is tested at S504. If the WARN flag is set then S505 tests to determine if both brake lamp flags L_BR and R_BR are set. If both flags are not set then S506 sets outputs to flash the amber lights 22, 24, 26 and 28. The flashing frequency was chosen to be 63 times per second. To conform to the standards, the flashing frequency may be any value between 60 and 85 that is at least 20 less than the flashing frequency at S501 and S503.

If S505 determines that both L_BR and R_BR are set, then outputs are set to steady burn the brake lamps 30 and 32 and flash the amber lamps 22, 24, 26 and 28 at the frequency of 63 times per minute.

If S504 determines that the WARN flag is not set then S508 tests L_BR and R_BR to determine if both flags are set. If they are then outputs are set at S509 to steady burn the brake lamps 30 and 32. If both flags are not set the program continues without setting an output to energize any signal lamp.

Although a preferred embodiment has been described in detail to illustrate the principles of the invention, it will be obvious that various modifications and substitutions may be made in the described embodiment without departing from the spirit and scope of the invention as defined by the appended claims. For example, the left turn, right turn and warn switches may be implemented as a single multiple position switch. Furthermore, it is obvious that the specific timer intervals may vary from the specific values mentioned in describing the preferred embodiment.

We claim:

1. A signal light system for self-propelled agricultural equipment, said system having no brake pedal and comprising:
    a left brake lamp and a right brake lamp visible from the rear of said equipment;
    left and right turn switches, each switch having an active state and an inactive state;
    a ground speed sensor producing a ground speed signal having a magnitude proportional to the ground speed of said equipment; and,
    a controller for sensing the states of said switches,
    said controller including means for computing the acceleration/deceleration of the equipment from the magnitude of said ground speed signal;
    said controller including means for comparing the computed acceleration/deceleration with a deceleration threshold and enabling the left brake lamp and the right brake lamp according to the states of said switches only if the equipment deceleration exceeds said deceleration threshold.

2. A signal light system as claimed in claim 1 wherein said controller includes means for enabling said left brake lamp and said right brake lamp as long as the equipment deceleration exceeds said deceleration threshold, and for a short interval of time after the equipment deceleration no longer exceeds said deceleration threshold.

3. A signal light system as claimed in claim 2 wherein said controller includes means for comparing the ground speed of said equipment with a speed threshold and enabling said deceleration comparing means only after the ground speed exceeds said speed threshold.

4. A signal light system as claimed in claim 3 wherein, said controller includes means for enabling said left brake lamp and said right brake lamp for an extended interval of time if, during said short interval, said ground speed drops below said speed threshold.

5. A signal light system as claimed in claim 1 wherein said controller enables the left and right brake lamps for simultaneous steady burning only if said left turn switch and said right turn switch are both in their inactive state.

6. A signal light system as claimed in claim 5 wherein said controller enables said right brake lamp only for steady burning when said left turn switch is in its active state and enables said left brake lamp only for steady burning when said right turn switch is in its active state.

7. A signal light system for self-propelled agricultural equipment, said system having no brake pedal and comprising:

at least one left and one right warning/turn signal lamp visible from the front of said equipment;

a left and a right brake lamp visible from the rear of said equipment;

a ground speed sensor producing a ground speed signal having a magnitude proportional to the ground speed of said equipment;

a plurality of signal control switches settable to an active state or an inactive state by an operator, said plurality of switches including a left turn switch, a right turn switch and a warning switch; and, a programmable controller for sensing the states of said switches, said programmable controller including means for computing the acceleration/deceleration of the equipment from the magnitude of said ground speed signal;

said programmable controller including, first means for comparing the computed acceleration/deceleration with a deceleration threshold and enabling the left and right brake lamps to be turned on only if the equipment deceleration rate exceeds said deceleration threshold; and, second means enabled by said first means for (1) enabling flashing of said at least one left warning/turn signal lamp and said left brake lamp and steady burning of said right brake lamp if said left turn switch is in its active state, (2) enabling flashing of said at least one right warning/turn signal lamp and said right brake lamp and steady burning of said left brake lamp if said right turn switch is active and, (3) enabling steady burning of both said left brake lamp and said right brake lamp if said left turn switch and said right turn switch are both inactive and said warn switch is either active or inactive.

8. A signal light system as claimed in claim 7 wherein said controller determines the speed of the equipment and inhibits said first means until said equipment is moving at greater than a threshold speed.

9. In self-propelled agricultural equipment having left and right turn signal switches each having an active and an inactive state and left and right brake lamps, a method of controlling the brake lamps without using a brake pedal, said method comprising:

sensing the ground speed of the equipment to produce a ground speed signal having a magnitude proportional to said ground speed;

when the ground speed exceeds a threshold speed, initiating computation of the acceleration/deceleration of the equipment from the magnitude of said sensed ground speed signal;

when the acceleration/deceleration exceeds a deceleration threshold, enabling the left and right brake lamps according to the states of said switches for as long as the deceleration exceeds the deceleration threshold and for a short interval of time thereafter, and, if the ground speed falls below said threshold speed during said short interval of time, enabling the left and right brake lamps according to the states of said switches for an extended interval of time.

10. A method as claimed in claim 9 wherein said short interval of time is about two seconds and said extended interval of time is about two minutes.

11. A signal light system for self-propelled agricultural equipment having no brake pedal, said system comprising:

a left brake lamp and a right brake lamp visible from the rear of said equipment;

left and right turn switches, each switch having an active state and an inactive state;

a ground speed sensor; and, a controller for sensing the states of said switches, said controller being responsive to said ground speed sensor for computing the acceleration/deceleration of the equipment;

said controller including means for comparing the computed acceleration/deceleration with a deceleration threshold and enabling the left brake lamp and the right brake lamp according to the states of said switches only if the equipment deceleration exceeds said deceleration threshold;

wherein said controller, enables the left and right brake lamps for simultaneous steady burning only if said left turn switch and said right turn switch are both in their inactive state, and wherein said controller enables said right brake lamp only for steady burning when said left turn switch is in its active state and enables said left brake lamp only for steady burning when said right turn switch is in its active state;

said system further comprising at least a left warning lamp, and a right warning lamp, and a warn switch having an active state and an inactive state, said controller being responsive to said warn switch to flash the left and right warning lamps at a first frequency when said warn switch is in its active state and flash one of said left and right warning lamps at a second frequency when said one of said left turn and right turn switches is active.

12. A signal light system as claimed in claim 11 wherein said agricultural equipment is a windrower comprising a self-propelled tractor with a removable header, said system having two left warning lamps connectable in parallel, one mounted on the tractor and one mounted on the header, and two right warning lamps connectable in parallel, one mounted on the tractor and one mounted on the header.

13. A signal light system as claimed in claim 1 wherein said controller is a programmable microprocessor responsive to said ground speed sensor and the sensed states of said switches for producing a first signal at a first output to enable said left brake lamp and a second signal at a second output to enable said right brake lamp.

\* \* \* \* \*